US009372991B2

(12) United States Patent
Kaufman (10) Patent No.: US 9,372,991 B2
(45) Date of Patent: Jun. 21, 2016

(54) DETECTING MALICIOUS COMPUTER CODE IN AN EXECUTING PROGRAM MODULE

(75) Inventor: Philip D. Kaufman, Omaha, NE (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/413,605

(22) Filed: Mar. 6, 2012

(65) Prior Publication Data

US 2013/0239215 A1 Sep. 12, 2013

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |
| G06F 21/55 | (2013.01) |
| G06F 21/50 | (2013.01) |
| G06F 21/52 | (2013.01) |

(52) U.S. Cl.
CPC ............. *G06F 21/566* (2013.01); *G06F 21/50* (2013.01); *G06F 21/52* (2013.01); *G06F 21/55* (2013.01); *G06F 21/56* (2013.01)

(58) Field of Classification Search
CPC ..... G06F 21/56; G06F 21/566; G06F 21/562; G06F 21/563; G06F 21/565; G06F 21/52; G06F 21/54; G06F 21/50; G06F 21/55
USPC ...................................... 726/24, 22; 713/188
See application file for complete search history.

(56) References Cited

U.S. PATENT DOCUMENTS

| 7,603,713 | B1 | 10/2009 | Belov |
| 8,020,207 | B2 | 9/2011 | Chow et al. |
| 8,104,089 | B1 * | 1/2012 | Guo et al. ........................ 726/24 |
| 2006/0026685 | A1 * | 2/2006 | Saito ................................ 726/23 |
| 2008/0126742 | A1 | 5/2008 | Shupak et al. |
| 2010/0257608 | A1 * | 10/2010 | Jeong et al. ..................... 726/24 |
| 2012/0255016 | A1 * | 10/2012 | Sallam ............................ 726/24 |
| 2012/0317645 | A1 * | 12/2012 | Fortier ............................ 726/24 |
| 2013/0160121 | A1 * | 6/2013 | Yazdani .......................... 726/23 |

FOREIGN PATENT DOCUMENTS

| CN | 101477605 A | 7/2009 |
| WO | 2007121361 A2 | 10/2007 |
| WO | 2007121361 A3 | 10/2007 |

OTHER PUBLICATIONS

"Are you worried About z/OS System Security? If Not, You Should Be". VAT Security, Home Page, Ensuring Systems Integrity for z/Series, [online] Accessed on Feb. 1, 2012. Copyright 2010-2012, Key Resources, Inc. <URL: http://www.vatsecurity.com/>.
"z/OS Vulnerability Analysis Tool (VAT) User's Guide Ensuring Systems Integrity for z/Series" [online] Accessed on: Jan. 31, 2012. Copyright Key Resources, Inc. 2010. URL: www.vatsecurity.com/uploads/zVAT_user_Primer.pdf.
Kaufman, Philip. "Detecting Malicious Computer Code in an Executing Program Module". U.S. Appl. No. 13/427,089, filed Mar. 22, 2012.

* cited by examiner

*Primary Examiner* — Linglan Edwards
*Assistant Examiner* — Forrest Carey
(74) *Attorney, Agent, or Firm* — Laura E. Gisler; Matthew Chung (57) ABSTRACT

Prior to execution of computer program instructions, the computer identifies one or more addresses in memory corresponding to the locations of one or more of the computer program instructions in the computer program. During execution of the computer program instructions, the computer identifies in the computer program another computer program instruction located in another address in the memory, and in response, the computer makes an indication that the computer program has an indicia of maliciousness.

14 Claims, 4 Drawing Sheets

DETECTING MALICIOUS COMPUTER CODE IN AN EXECUTING PROGRAM MODULE

FIELD OF THE INVENTION

The present invention relates generally to detecting a malicious computer program, and more particularly to detecting program instructions that are hidden in the program.

BACKGROUND

Typically, computer viruses and other malware are detected by scanning for a signature pattern of bits associated with the malware. Among the ways viruses and other types of malware are designed to escape detection by virus scanner software is to obfuscate or scramble their malicious code into an unrecognizable format within a stored executable program module. Then, as the program is actively executing, the scrambled code is unscrambled by itself into executable code so that the CPU can execute the code. For example, different parts of a sequence of malicious instructions can be scattered and fragmented in the program in an inoperable and unrecognizable form prior to initial execution, and repositioned and combined during subsequent execution so they become operable. This technique is referred to as virus obfuscation. The obfuscated virus can be designed so that it may take several executions of the program module before the malicious code is fully assembled and ready for execution. An object of the present invention is to detect obfuscated malware.

SUMMARY

Embodiments of the present invention provide a system, method, and program product to determine if a computer program in a memory of a computer is malicious. A computer program includes one or more computer program instructions, each computer program instruction is located at an address in the computer memory from which it can be executed. Prior to execution of the computer program instructions, the computer identifies one or more addresses in the memory corresponding to the locations of one or more of the computer program instructions in the computer program. During execution of the computer program instructions, the computer identifies in the computer program another computer program instruction located in another address in the memory, and in response, the computer makes an indication that the computer program has an indicia of maliciousness.

In certain embodiments of the invention, the one or more computer program instructions identified prior to execution of the computer program instructions are the occurrences in the computer program of computer program instructions of one or more predetermined program instruction types, and the other program instruction identified during execution of the computer program instructions is an occurrence in the computer program of a computer program instruction, not identified prior to execution, of one of the one or more predetermined program instruction types.

In other embodiments of the invention, the one or more predetermined program instruction types include at least the type operating system interrupt generating program instruction.

In still other embodiments of the invention, the identifying during execution is performed by a program routine that is called upon the execution of a computer program instruction of the type operating system interrupt generating program instruction.

In still other embodiments of the invention, the computer inserts a custom program instruction into the computer program, the custom program instruction being an operating system interrupt generating program instruction type. Prior to execution of the computer program, the computer identifies one or more addresses in the memory corresponding to locations of all of the computer program instructions in the computer program of the one or more predetermined program instruction types. During execution of the computer program instructions, the computer, upon execution of the inserted custom program instruction, identifies in the computer program another computer program instruction of one of the one or more predetermined program instruction types, located in another address in the memory, and in response, the computer making an indication that the computer program has an indicia of maliciousness.

In still other embodiments of the invention, the computer making an indication that the computer program has an indicia of maliciousness includes at least one of the following functions: program termination, program suspension, generating a warning, outputting an entry into a log file.

In still other embodiments, prior to execution, the other instruction is obfuscated, and, during execution, the other instruction is de-obfuscated.

DETAILED DESCRIPTION

Embodiments of the present invention will now be described in detail with reference to the accompanying drawings.

Figure 1:
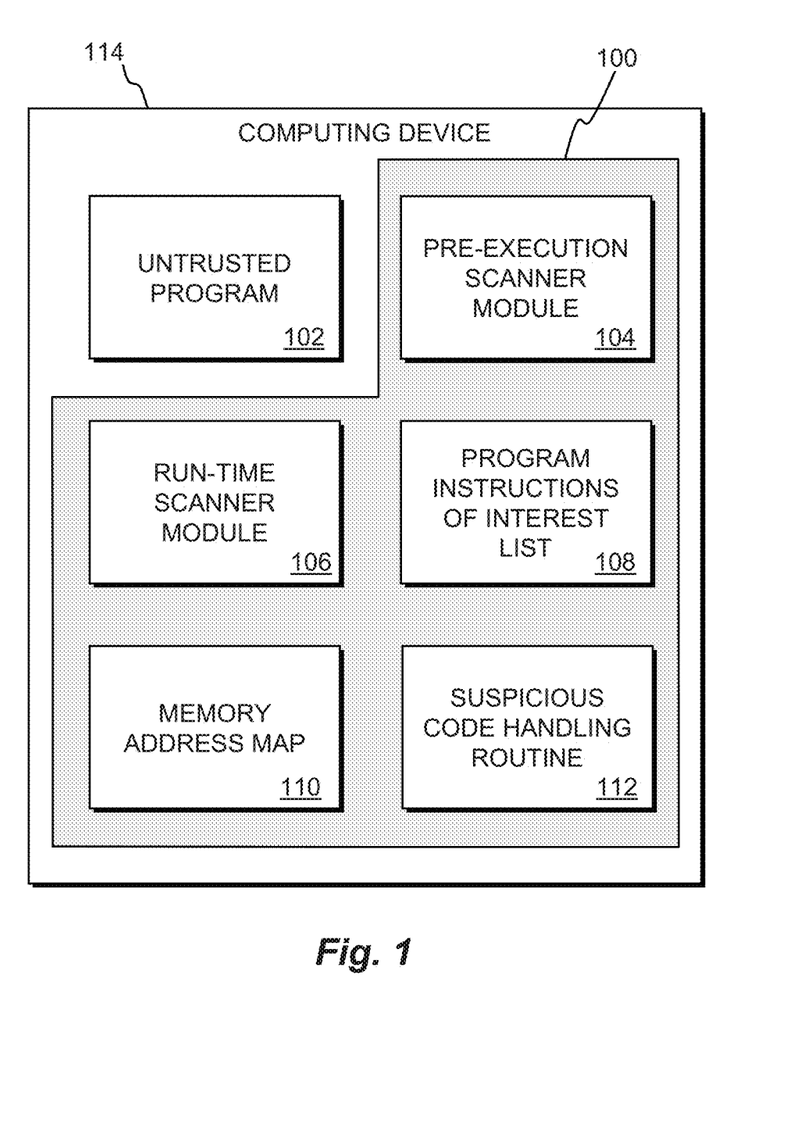
FIG. 1 is a functional block diagram of a malware detection system in accordance with an embodiment of the present invention.

FIG. 1 is a functional block diagram of a malware detection program 100 that operates on untrusted program 102 in accordance with an embodiment of the present invention. In a preferred embodiment, malware detection program 100 includes pre-execution scanner module 104, run-time scanner module 106, program instructions of interest list 108, memory address map 110, and suspicious code handling routine 112, all installed and executing in a computing device 114.

In preferred embodiments of the invention, computing device 114 can be a mainframe or mini computer, a laptop, tablet, or netbook personal computer (PC), or a desktop computer. In general, computing device 114 can be any programmable electronic device that has operating system functions capable of receiving and servicing interrupt requests from an actively running untrusted program 102, a loader function to load a untrusted program 102, and sufficient volatile memory to handle the software requirements of storing and running the pre-execution and run-time scanner modules 104 and 106, respectively, and as described in further detail with respect to FIG. 4.

Untrusted program 102 may be downloaded from a server via a network and is loaded into computer memory, for example, random access memory (RAM) 822, from permanent storage, for example, tangible storage device 830, by the load process of, for example, operating system 828, of computing device 114. Untrusted program 102 typically results from having an executable module produced by a language compiler, and is loaded into memory by the load and execute process of, for example, operating system 828. In a preferred embodiment, untrusted program 102 is divided into different segments, such as code segments that contain executable instructions, and data segments that contain global and static program variables.

As explained in more detail below, after untrusted program 102 is loaded into memory of computing device 114 but before it executes, pre-execution scanner module 104 generates memory address map 110 containing the logical memory addresses of certain types of privileged program instructions and stores memory address map 110 in memory. These types of privileged instructions result in operating system interrupts, such as input/output (I/O) instructions that can be used to cause malicious damage in the computing environment. When active execution of the untrusted program 102 instructions begins and an interrupt-generating program instruction executes, program execution is suspended while the operating system services the interrupt. As part of interrupt handling, the operating system calls run-time scanner module 106 that determines if the interrupt being serviced is an interrupt-generating program instruction of interest. If so, run-time scanner module 106 checks that the memory address from which the interrupt-generating program instruction of interest executed is in memory address map 110. If the address from which the program instruction executed is not in memory address map 110, this could indicate that a new executable instruction has appeared in the executing program module, for example, from obfuscated malicious code that has been assembled within the program module. Run-time scanner module 106 will then, for example, terminate the program. The preferred embodiment and other embodiments of the invention will be described in more detail below.

Pre-execution scanner module 104 generates memory address map 110, as described more fully below. Memory address map 110 resides in an address range of memory 822 (illustrated in FIG. 4) that is associated with the execution of untrusted program 102. In a preferred embodiment, memory address map 110 contains the set of memory addresses and associated program instruction values from untrusted program 102 from which one or more program instructions of interest are executed. The memory addresses in memory address map 110 are the logical or virtual addresses at which the program instructions of interest reside in untrusted program 102 after it is loaded for execution, but prior to active program instruction execution. Similarly, the program instruction values associated with the memory addresses of the program instructions of interest are the program instruction values present in untrusted program 102 after it is loaded for execution, but prior to active execution. As explained more fully below, memory address map 110 is used by run-time scanner module 106 to check that memory addresses of program instructions of interest in actively executing untrusted program 102 match the corresponding address information in memory address map 110. At a computer hardware level, program instruction execution typically occurs by program instructions in RAM storage 822 being fetched by a processor 820 for execution. For ease of explanation, this instruction execution process will be referred to as program instructions being executed from a memory location.

In a preferred embodiment, the program instructions of interest are defined at a system level, for example, by a system administrator, and at least include program instructions that can directly cause malicious harm in the computing environment. For example, the program instructions of interest typically will include those related to input/output operations, such as those program instructions directed to disk writes. The program instructions of interest can be a subset of all available program instructions, or can be the entire set of available program instructions. The program instructions of interest include at least one or more program instructions that will generate a system interrupt, such as those related to input/output operations, so that execution control can be passed to run-time scanner module 106 to determine whether the memory addresses from which these instructions are executed are in memory address map 110.

In a preferred embodiment, program instructions of interest list 108 contains the instruction values of the system defined program instructions of interest. When untrusted program 102 is loaded into memory for execution, program instructions of interest list 108 is also loaded into memory.

While execution of an interrupt-generating instruction is needed for control to pass to run-time scanner module 106 for instruction address and value checking, not every mapped program instruction of interest will necessarily generate a system interrupt. For example, the program instructions of interest may include certain privileged instructions that do not cause a system interrupt, certain non-privileged "sensitive" instructions that can directly result in malicious damage, or all program instructions in untrusted program 102. An example of such an instruction is the MOVE instruction, used by mainframe computers manufactured by International Business Machines Corp. (IBM), which can modify a restricted portion of system memory without creating an interrupt. Program instructions of interest list 108 would include the MOVE instruction, and Memory address map 110 would contain, for example, every occurrence of the MOVE instruction in untrusted program 102. When run-time scanner module 106 is called as a result of the execution of an interrupt-generating program instruction of interest in program instructions of interest list 108, run-time scanner module 106 can perform a scan of untrusted program 102 in memory while it is executing to check that every occurrence of the MOVE instruction in the executing untrusted program 102 appears in memory address map 110. If a high degree of security is desired, the pre-execution memory address map 110 can contain every executable instruction in the program module.

In other embodiments of the invention, the program instructions of interest can include one or more custom or "dummy" executable instructions. These custom interrupt instructions are specifically designed to generate a system interrupt so as to allow run-time scanner module 106 to perform a scan on untrusted program 102 while it is executing. For example, a custom interrupt instruction can be a customized supervisor call (SVC) instruction on an IBM mainframe that is designed to always complete successfully, but is modified to call run-time scanner module 106 before completion. These custom interrupt instructions can be useful in the situation where the program module as written has few, or no, instructions that generate interrupts, or in situations where a high level of scanning is desired. The custom interrupt instructions can, for example, overlay existing instructions in untrusted program 102 at regular address intervals at load time, with the overlaid instructions saved into a save area. After a custom interrupt instruction has executed and run-time scanner module 106 has completed its scan of untrusted program 102, the overlaid program instruction can, for example, be restored to its original untrusted program 102 location, the program location counter in the program status word (PSW) can be rolled back to point to the location of the newly restored instruction, and program execution can resume.

Pre-execution scanner module 104 operates to create memory address map 110. In a preferred embodiment, pre-execution scanner module 104 scans untrusted program 102 after it is loaded into memory, but before it is actively executing. For example, header information in untrusted program 102 is parsed by the pre-execution scanner module 104 to identify code segments containing executable instructions. The code segments in memory are then scanned for occurrences of instruction values included in program instructions of interest list 108, and memory address map 110 is created, which includes entries containing the logical memory address, and the associated program instruction value, of each occurrence of an instruction value in untrusted program 102 that is included in program instructions of interest list 108.

In certain embodiments, memory address map 110 is generated by pre-execution scanner module 104 by first identifying code segments containing executable code from, for example, program header information, then scanning the identified code segments in memory after untrusted program 102 has been loaded into memory for the first time, but before first execution. The code segments in memory are scanned for occurrences of instruction values included in program instructions of interest list 108, and memory address map 110 is created and written to permanent storage, such as tangible storage device 830. When untrusted program 102 is loaded for execution, memory address map 110 is also loaded from tangible storage device 830.

In alternative embodiments, memory address map 110 is not a mapping of instructions of interest to memory locations, but rather a copy of the original program module as it existed after compilation and before first execution, or a copy of untrusted program 102 when loaded but before active execution. In these embodiments, run-time scanner module 106 performs, for example, a byte-by-byte comparison of the program module contained in memory address map 110 and the actively executing untrusted program 102 to identify differences that might indicate the presence of malware in untrusted program 102.

Run-time scanner module 106 operates to perform comparisons of information contained in untrusted program 102, and memory address map 110 and program instructions of interest list 108. In a preferred embodiment, run-time scanner module 106 is called by the operating system at the start of servicing of operating system interrupts generated by interrupt-generating program instructions. For example, the operating system interrupt routine that services interrupt-generating program instructions is modified to first call run-time scanner module 106 before addressing the actual reason the interrupt was generated.

In a preferred embodiment, run-time scanner module 106 is passed the program memory address, and instruction value, from which the interrupt-generating program instruction was executed that caused the operating system interrupt. In a first level scan, run-time scanner module 106 determines if the passed instruction value is contained in program instructions of interest list 108. If the instruction value is not in list 108, then run-time scanner module 106 returns control to the calling system interrupt routine to continue normal processing of the interrupt-generating program instruction. If the instruction value is in list 108, then run-time scanner module 106 compares the passed program memory address and the associated program instruction value with information contained in memory address map 110. If an entry in memory address map 110 matches the program execution address and program instruction value, this is considered normal, and run-time scanner module 106 returns control to the calling system interrupt routine to continue normal processing of the interrupt-generating program instruction. If a matching entry in memory address map 110 is not found, this could indicate that obfuscated malicious code may have been assembled into new executable code within untrusted program 102, and suspicious code handling routine 112 is called which will, for example, terminate the program.

In other embodiments in which a higher level of security is desired, program instructions of interest list 108 contains instruction address and value entries for program instructions of interest that may include certain privileged instructions that do not result in a system interrupt, certain non-privileged "sensitive" instructions that can directly result in malicious activities, or all program instructions in the program module, as described above. In these embodiments, a second level scan is performed by run-time scanner module 106. When an interrupt-generating program instruction of interest executes, run-time scanner module 106 performs a first level scan, as described above, to check that the passed program memory address and the associated program instruction value of the interrupt-generating program instruction of interest matches an entry in memory address map 110. If there is a matching entry in memory address map 110, then run-time scanner module 106 performs a second level scan of untrusted program 102.

The second level scan checks for matching entries in memory address map 110 of all occurrences in untrusted program 102 of any program instruction contained in program instructions of interest list 108. For example, run-time scanner module 106 can step down the code segments of untrusted program 102 instruction by instruction and perform a check to determine if a program instruction value in untrusted program 102 is included in program instructions of interest list 108. For untrusted program 102 instruction values that are included in program instructions of interest list 108, run-time scanner module 106 checks that an entry is found in memory address map 110 that matches on program instruction value and program memory address.

In the alternative embodiment in which memory address map 110 contains a copy of the original program module as it existed after compilation and before first execution, or after load but before execution, run-time scanner module 106 will perform, for example, a byte-by-byte comparison of the original program module contained in memory address map 110 and the actively executing untrusted program 102 to identify differences that might indicate the presence of malware in untrusted program 102.

In certain embodiments, run-time scanner module 106 is called as part of the program exit and cleanup process. This has the advantage of obtaining a scan after all logic of the program has executed. In these embodiments, a second level scan of untrusted program 102 is performed, as described above in relation to the execution of interrupt-generating program instructions of interest. For example, at program exit, run-time scanner module 106 can scan all code segments of untrusted program 102 to check that all program instructions of interest, for example, those listed in program instructions of interest list 108, have matching entries in memory address map 110. If a matching entry in memory address map 110 is not found, this could indicate that obfuscated malicious code may been assembled within untrusted program 102, and suspicious code handling routine 112 is called which will, for example, terminate the program and generate a warning report.

Suspicious code handling routine 112 is called by run-time scanner module 106 when run-time scanner module 106 identifies a mismatch between information in untrusted program 102 and memory address map 110, such as when a program instruction of interest at a certain memory location in untrusted program 102 does not have a matching entry in memory address map 110. In a preferred embodiment, because this can indicate that a new executable instruction has appeared in executing untrusted program 102 and that obfuscated malicious code may been assembled within the program module, a conservative approach is taken and suspicious code handling routine 112 immediately terminates execution of untrusted program 102 in accordance with the process and procedures of the computing system environment. Typically, a warning report will be generated. In other embodiments, suspicious code handling routine 112 can, for example, log an entry in a warning report, and return to normal execution of the program instructions. Although suspicious code handling routine 112 is illustrated and described as a separate called routine, it will be recognized by those skilled in the art that suspicious code handling routine 112 can be implemented as an integrated function within run-time scanner module 106.

Figure 2:
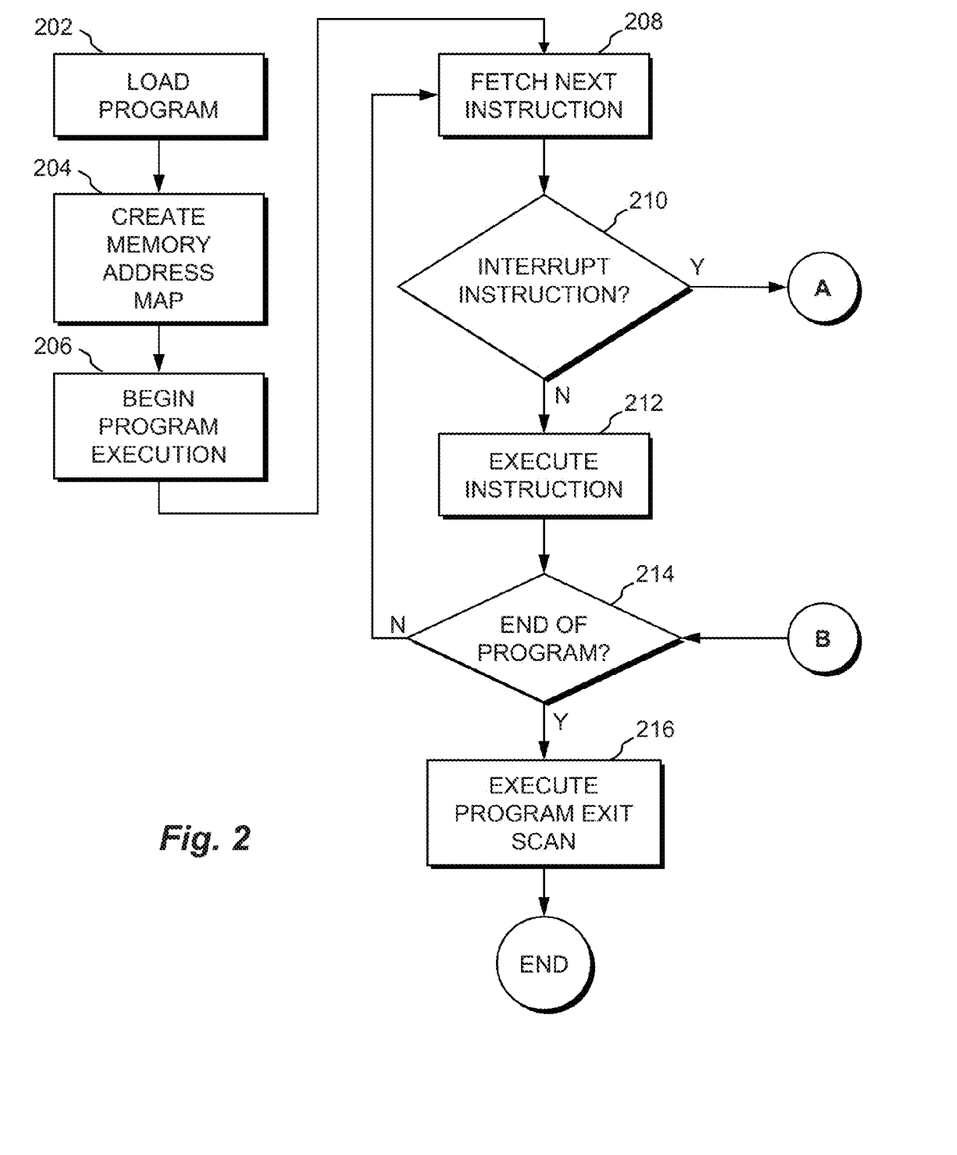
FIG. 2 is a flowchart illustrating the steps of an aspect of the malware detection system of FIG. 1 in accordance with an embodiment of the present invention.
Figure 3:
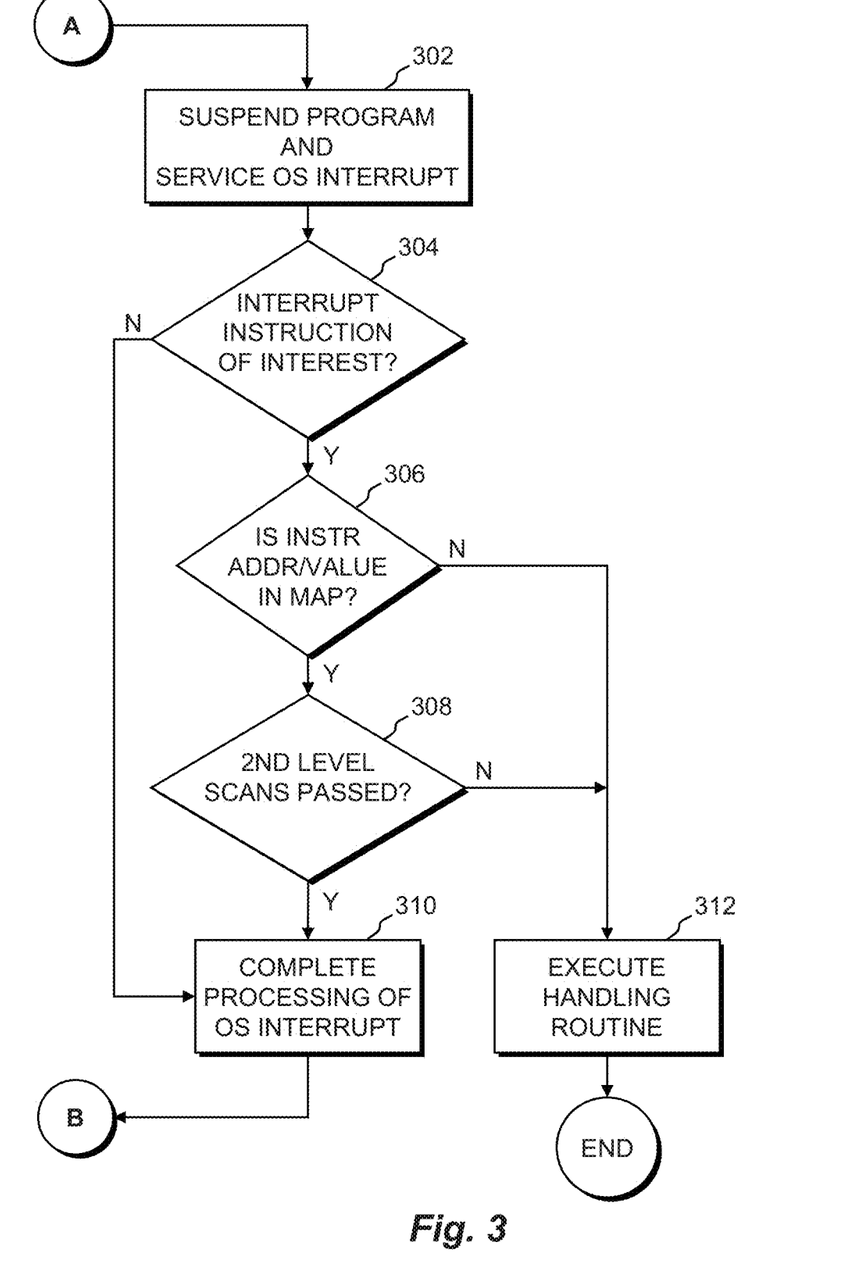
FIG. 3 is a continuation of the flowchart of FIG. 2 illustrating the steps of an aspect of a malware detection system in accordance with an embodiment of the present invention.

FIGS. 2 and 3 are flowcharts illustrating the general steps of malware detection program 100, as well as some steps the operating system 828 of computing device 114 performs, in accordance with a preferred embodiment of the present invention. At step 202, the load process of the operating system 828 of computing device 114 loads untrusted program 102 into memory 822 from permanent disk storage 830. At step 204, pre-execution scanner module 104 creates memory address map 110 of certain types of program instructions contained in untrusted program 102, based on program instructions of interest list 108 and scanning of untrusted program 102, and stores the map in memory. At step 206, operating system 828 initiates execution of untrusted program 102 by processor 820 and, at step 208, the first executable program instruction of untrusted program 102 is fetched for execution by processor 820.

At decision step 210, operating system 828 determines if the fetched program instruction is an interrupt-generating program instruction. If the fetched program instruction is not an interrupt-generating program instruction, then at step 212, the instruction is executed by processor 820 in the standard manner. At decision step 214, operating system 828 determines if normal program execution has ended. If, at decision step 214, it is determined that the end the untrusted program 102 has not occurred, then at step 208, the next program instruction is fetched. If, at decision step 214, it is determined that normal program execution has ended, then, at step 216, operating system 828 calls run-time scanner module 106 to perform a program exit scan. If the results of the program exit scan do not indicate the appearance of suspicious code in untrusted program 102, program execution ends with the standard operating system program exit and cleanup process. If, at step 216, the results of the program exit scan indicate the appearance of suspicious code in untrusted program 102, a warning is generated, for example, a message to the computer operator or an error report to be sent to the appropriate person, and the program execution ends with the standard operating system program exit and cleanup process.

If at decision step 210, operating system 828 determines that the just-fetched program instruction is an interrupt-generating program instruction, then at step 302, operating system 828 suspends execution of untrusted program 102 and begins servicing the operating system interrupt. At decision step 304, run-time scanner module 106 is called by the interrupt servicing routine and determines if the interrupt-generating program instruction is a program instruction of interest, based on program instructions of interest list 108. If the interrupt-generating program instruction is not a program instruction of interest, then at step 310, operating system 828 services the interrupt in the standard manner, and the execution of untrusted program 102 resumes at step 214.

If, at decision step 304, it is determined that the interrupt-generating program instruction is a program instruction of interest, then at decision step 306, run-time scanner module 106 determines if the memory address from which the interrupt-generating program instruction of interest was executed, and the associated instruction value, have a corresponding entry in memory address map 110. If a corresponding entry is found in memory address map 110, then at decision step 308, second level scans, if any, are performed. If the second level scans determine that all program instructions of interest in untrusted program 102, based on program instructions of interest list 108, have corresponding entries in memory address map 110, then at step 310, operating system 828 services the interrupt in the standard manner, and execution of program instructions resumes at step 214.

If at decision step 306 or decision step 308, run-time scanner module 106 determines that there is a program instruction of interest in untrusted program 102 that does not have a corresponding entry in memory address map 110, then at step 312, suspicious code handling routine 112 is executed and, in a preferred embodiment, execution of untrusted program 102 is terminated.

Figure 4:
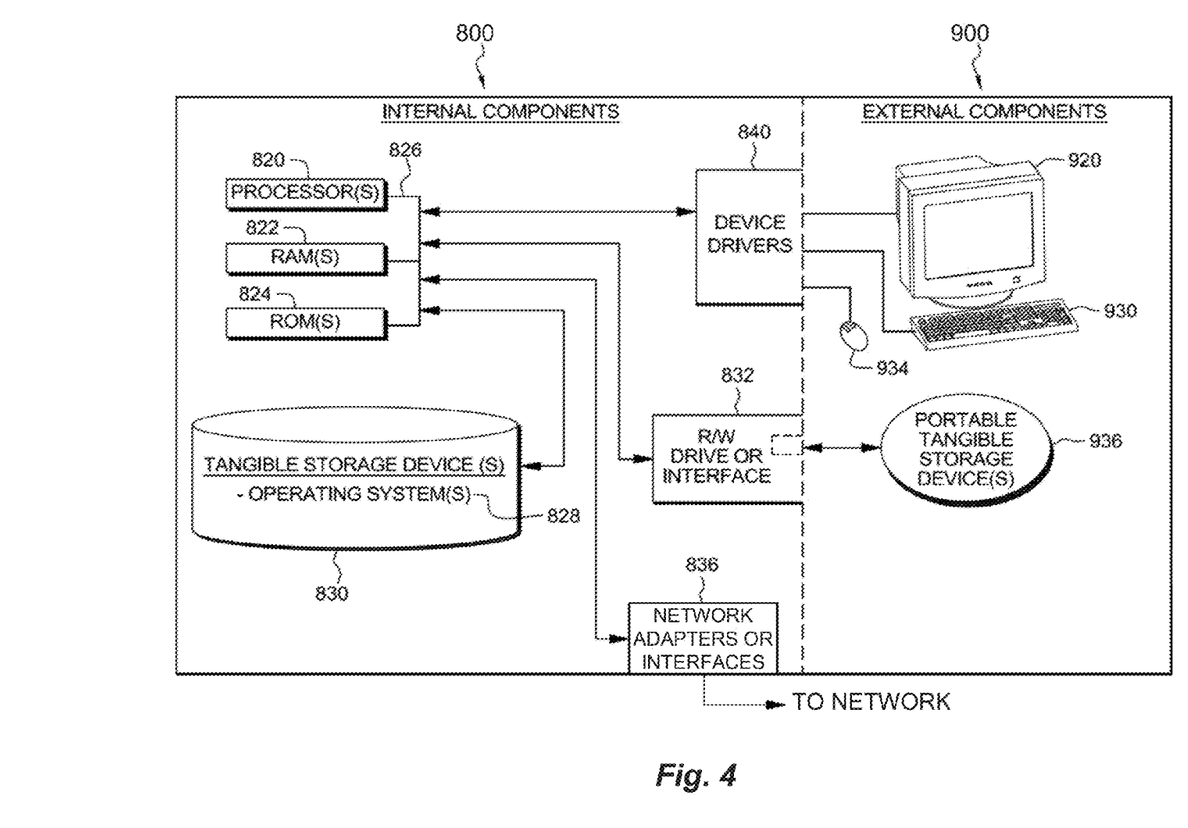
FIG. 4 is a block diagram of hardware and software within the computing device of FIG. 1 in accordance with an embodiment of the present invention.

FIG. 4 shows a block diagram of the components of a data processing system 800, 900, such as computing device 114, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, mainframe computer systems, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing device 114 includes internal components 800 and external components 900 illustrated in FIG. 4. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 110, 106, and 108 in computing device 114 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 102, 104, and 108 in computing device 114 can be stored on one or more of the respective portable computer-readable tangible storage devices 936, read via the respective R/W drive or interface 832 and loaded into the respective hard drive 830. The term "computer-readable tangible storage device" does not include a signal propagation media such as a copper cable, optical fiber or wireless transmission media.

Internal components 800 also includes network adapters or interfaces 836 such as a TCP/IP adapter cards, wireless wi-fi interface cards, or 3G or 4G wireless interface cards or other wired or wireless communication links. The programs 104, 106, and 108 in computing device 114 can be downloaded to computing device 114 from an external computer via a network (for example, the Internet, a local area network or other, wide area network) and network adapters or interfaces 836. From the network adapters or interfaces 836, the programs 104, 106, and 108 in computing device 114 are loaded into hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method to determine if a computer program in a memory of a computer is malicious, the computer program including computer program instructions, the method comprising the steps of:

the computer identifying, for a set of instructions from the computer program, a set of addresses in the memory, the set of addresses corresponding to respective instruction locations for the set of instructions, the corresponding of the addresses to the respective instruction locations occurring at a time that the computer program is loaded into the memory;

during execution of the computer program, and in response to executing an interrupt generating program instruction, the interrupt generating program instruction being a subset of the set of instructions, the computer identifying changes to the set of instructions by comparing the set of addresses to current address locations for instructions of the computer program, wherein the identifying changes occurs before an interrupt handler triggered by the interrupt generating program instruction executes a normal process of the interrupt handler dictated by the computer program instructions, and in response to identifying changes to the set of instructions, the computer indicating that the computer program has an indicia of maliciousness.

2. The method in accordance with claim 1, further comprising generating a map between the set of instructions and the set of addresses in the memory and using the map to compare the set of addresses to current address locations for the set of instructions.

3. The method in accordance with claim 1, wherein the computer indicating includes carrying out at least one function from a group consisting of: program termination, program suspension, generating a warning, and outputting an entry into a log file.

4. A computer program product for determining if a computer program in a memory of a computer is malicious, the computer program product comprising:

a computer readable storage medium, that is not a transitory signal per se, having first program instructions embodied therewith, the first program instructions executable by a processor circuit to cause the processor circuit to:

identify, for a set of instructions that are from the computer program, a set of addresses in the memory that correspond to respective instruction locations, the corresponding of the addresses to the respective instruction locations occurring at a time that the computer program is loaded into the memory;

identify, during execution of the computer program, and in response to executing an interrupt generating program instruction, the interrupt generating program instruction being a subset of the set of instructions, changes to the set of instructions by comparing the set of addresses to current address locations for instructions of the computer program, wherein the identifying changes occurs before an interrupt handler triggered by the interrupt generating program instruction executes a normal process of the interrupt handler, the normal process of the interrupt handler dictated by the computer program instructions; and indicating, in response to identifying changes to the set of instructions, that the computer program has an indicia of maliciousness.

5. The computer program product of claim 4, wherein the set of addresses includes respective address locations for each instruction of the computer program.

6. The computer program product of claim 4, wherein the first program instructions executable by a processor circuit further cause the processor circuit to identify the set of addresses in the memory by scanning the computer program for instructions of a certain type.

7. The computer program product of claim 6, wherein the certain type includes write and move instructions.

8. A computer system to determine if a computer program in a memory of a computer is malicious, the computer system comprising:
   at least one processing circuit;
   at least one computer-readable storage medium for storing first program instructions that when executed are configured to cause the at least one processing circuit to:
   identify, for a set of instructions that are from the computer program, a set of addresses in the memory, the set of addresses corresponding to respective instruction locations, the corresponding of the addresses to the respective instruction locations occurring at a time that the computer program is loaded into the memory;
   identify, during execution of the computer program, and in response to executing an interrupt generating program instruction, the interrupt generating program instruction being a subset of the set of instructions, changes to the set of instructions by comparing the set of addresses to current address locations for instructions of the computer program, wherein the identifying changes occurs before an interrupt handler triggered by the interrupt generating program instruction executes a normal process of the interrupt handler, the normal process of the interrupt handler dictated by the computer program instructions; and
   make, in response to identifying changes to the set of instructions, an indication that the computer program has an indicia of maliciousness.

9. The system of claim 8, wherein the first program instructions, when executed, are further configured to cause the at least one processing circuit to identify changes to the set of instructions by calling a run-time scanner module in response to an interrupt generated by the computer program.

10. The system of claim 8, wherein the first program instructions, when executed, are further configured to cause the at least one processing circuit to determine whether an interrupt generated by the computer program corresponds to an instruction from the set of instructions.

11. The system of claim 10, wherein the first program instructions, when executed, are further configured to cause the at least one processing circuit to service, in response to determining that the interrupt generated by the computer program does not correspond to an instruction from the set of instructions, the interrupt generated by the computer program without providing an indicia of maliciousness.

12. The system of claim 8, wherein the set of instructions includes all instructions in the computer program.

13. The system of claim 8, wherein the first program instructions, when executed, are further configured to cause the at least one processing circuit to perform, in response to the indicia of maliciousness, at least one function from the group consisting of: program termination, program suspension, generating a warning, and outputting an entry into a log file.

14. The system of claim 8, wherein the first program instructions, when executed, are further configured to cause the at least one processing circuit to select the set of instructions based upon a predetermined program instruction type characteristic of malware.

* * * * *